United States Patent
Bloomquist et al.

(10) Patent No.: US 10,194,652 B1
(45) Date of Patent: Feb. 5, 2019

(54) INTELLIGENT DECOY CONTROL RIG DEVICE AND METHOD OF OPERATING

(71) Applicant: Arc Archer LLC, Cedar Springs, MI (US)

(72) Inventors: David Bloomquist, Sparta, MI (US); Adam Kelly, Sand Lake, MI (US)

(73) Assignee: ARC ARCHER LLC, Cedar Springs, MI (US)

( * ) Notice: Subject to any disclaimer, the term of this patent is extended or adjusted under 35 U.S.C. 154(b) by 215 days.

(21) Appl. No.: 14/996,603

(22) Filed: Jan. 15, 2016

Related U.S. Application Data (60) Provisional application No. 62/103,873, filed on Jan. 15, 2015.

(51) Int. Cl.
*A01M 31/00* (2006.01)
*A01M 31/06* (2006.01)
*G10L 15/22* (2006.01)

(52) U.S. Cl.
CPC .......... *A01M 31/06* (2013.01); *A01M 31/002* (2013.01); *A01M 31/004* (2013.01); *G10L 15/22* (2013.01); *G10L 2015/227* (2013.01)

(58) Field of Classification Search
CPC .. A01M 31/002; A01M 31/004; A01M 31/06; G10L 15/22; G10L 2015/227
USPC .......................................................... 43/2, 3
See application file for complete search history.

(56) References Cited

U.S. PATENT DOCUMENTS

| | | | | |
|---|---|---|---|---|
| 4,965,552 A * | 10/1990 | Price | ..................... | A01M 29/16 340/566 |
| 5,289,654 A * | 3/1994 | Denny | .................. | A01M 31/06 43/2 |
| 6,206,745 B1* | 3/2001 | Gabai | ...................... | A63H 3/28 446/175 |
| 7,173,534 B1* | 2/2007 | Markham | ............. | A01M 29/16 340/309.16 |
| 7,562,487 B2* | 7/2009 | Barr | ...................... | A01M 31/06 43/2 |
| 7,966,963 B1* | 6/2011 | Caldwell | ............... | A01M 29/06 116/22 A |
| 2002/0064094 A1* | 5/2002 | Gaspari | ............... | A01M 31/004 367/139 |
| 2003/0041500 A1* | 3/2003 | Thomas | ................ | A01M 31/06 43/2 |
| 2003/0204983 A1* | 11/2003 | Porter | .................. | A01M 31/06 43/3 |

(Continued)

*Primary Examiner* — Darren W Ark
*Assistant Examiner* — Brady W Frazier
(74) *Attorney, Agent, or Firm* — Gardner Linn (57) ABSTRACT

A jerk rig control device and method are provided for automatically controlling a jerk rig for moving decoys. The device controls the jerk rig by distinguishing target call sounds from one another and from other sounds, and moving the jerk rig in a motion corresponding to the target call sounds. The device includes a microphone that converts different sounds to different sound signals, and a controller that distinguishes between the sound signals to either generate an actuation signal, or to not generate any actuation signal. Optionally, the controller distinguishes between different sound signals to generate different actuation signals that correspond to the different sound signals. An actuator is operable to move one or more hunting decoys in response to the actuation signals.

16 Claims, 6 Drawing Sheets

(56) References Cited

U.S. PATENT DOCUMENTS

| | | | |
|---|---|---|---|
| 2006/0207158 A1* | 9/2006 | Brewer | A01M 31/06 43/3 |
| 2010/0139146 A1* | 6/2010 | Elpi | A01M 31/06 43/3 |
| 2011/0113672 A1* | 5/2011 | Holmberg | A01M 31/06 43/2 |
| 2013/0249218 A1* | 9/2013 | Vassilev | A01M 29/16 290/55 |
| 2015/0164063 A1* | 6/2015 | Rutledge | A01M 31/06 43/2 |

* cited by examiner

INTELLIGENT DECOY CONTROL RIG DEVICE AND METHOD OF OPERATING

CROSS REFERENCE TO RELATED APPLICATION

The present application claims the benefit of U.S. provisional application, Ser. No. 62/103,873, filed Jan. 15, 2015, which is hereby incorporated by reference in its entirety.

FIELD OF THE INVENTION

The present invention relates to jerk rigs for moving decoys, such as for use in waterfowl hunting.

BACKGROUND OF THE INVENTION

Hunters must safely control a firearm while hunting, and may wish to also operate an animal call, and in some instances, control the movement of a decoy. The hunter may wish to move a decoy to mimic the motion of the target animal, so that the decoy further resembles the target animal, which increases the decoy's effectiveness. The decoy is coupled to a line that can be pulled and released to linearly move the decoy, such as when the decoys are anchored by an elastic cord. This arrangement for decoys is sometimes called a "jerk rig." When positioned on a body of water or ground, the decoys are capable of mimicking movements of live animals when moved via the jerk rig.

However, the hunter may wish to operate an animal call and control the movement of a decoy while safely controlling a firearm, in addition to other tasks, simultaneously, and hunters often have difficulty effectively and safely conducting each task. For example, the hunter may be using a mouth-operated call or hand-operated call to mimic a target animal, holding a firearm in a ready position with both hands, and controlling the movement of decoys. It is desirable for hunters to be able to safely conduct multiple hunting tasks.

SUMMARY OF THE INVENTION

The present invention provides a jerk rig control device that is particularly well suited for automatically controlling a jerk rig for moving hunting decoys, such as ducks or other waterfowl on a pond. The device automatically controls the jerk rig by distinguishing sounds that are target animal calls from ambient or other sounds, and actuates the jerk rig in a manner corresponding to the target animal calls, as appropriate. For example, the device can distinguish between duck calls and ambient sounds such as human voices or rustling leaves, and may further distinguish between different types or styles of animal calls to actuate the decoys in different ways.

According to one form of the present invention, a device for automatically operating a jerk rig to move hunting decoys includes a microphone configured to generate a first sound signal in response to a first target animal call and a second sound signal in response to a second target animal call that is different from the first target animal call. A controller is in communication with the microphone, and is configured to distinguish between the first sound signal and the second sound signal. The controller generates a first actuation signal in response to the first sound signal. An actuator is in communication with the controller and is operable to move a hunting decoy in response to the actuation signal. Optionally, the device is also operable to automatically move the decoys at periodic intervals and not in response to a target animal call or silent period.

According to another form of the present invention, a method of operating the intelligent jerk rig control device includes listening for target animal calls with a microphone during a predetermined timeframe, wherein the target animal call is one of two different types. The type of the target animal call is determined by a controller, which energizes an actuator to automatically move decoys in a first movement in response a first type of target animal call. The actuator is also operable in response to the controller to automatically move decoys in a second movement in response to a second type of target animal call.

Thus, it will be appreciated that the jerk rig control device is operable to automatically control jerk rigs for moving hunting decoys, such as duck or waterfowl decoys on a pond. The jerk rig control device allows the user, such as a hunter, to reduce the required workload and increase control by controlling decoys in a hands-free manner, such as while operating a call and holding a firearm. This improves the safety and effectiveness of the hunter simultaneously controlling a firearm, operating an animal call, and controlling the movement of the decoy.

These and other objects, advantages, purposes and features of this invention will become apparent upon review of the following specification in conjunction with the drawings.

DESCRIPTION OF THE PREFERRED EMBODIMENTS

Figure 1:
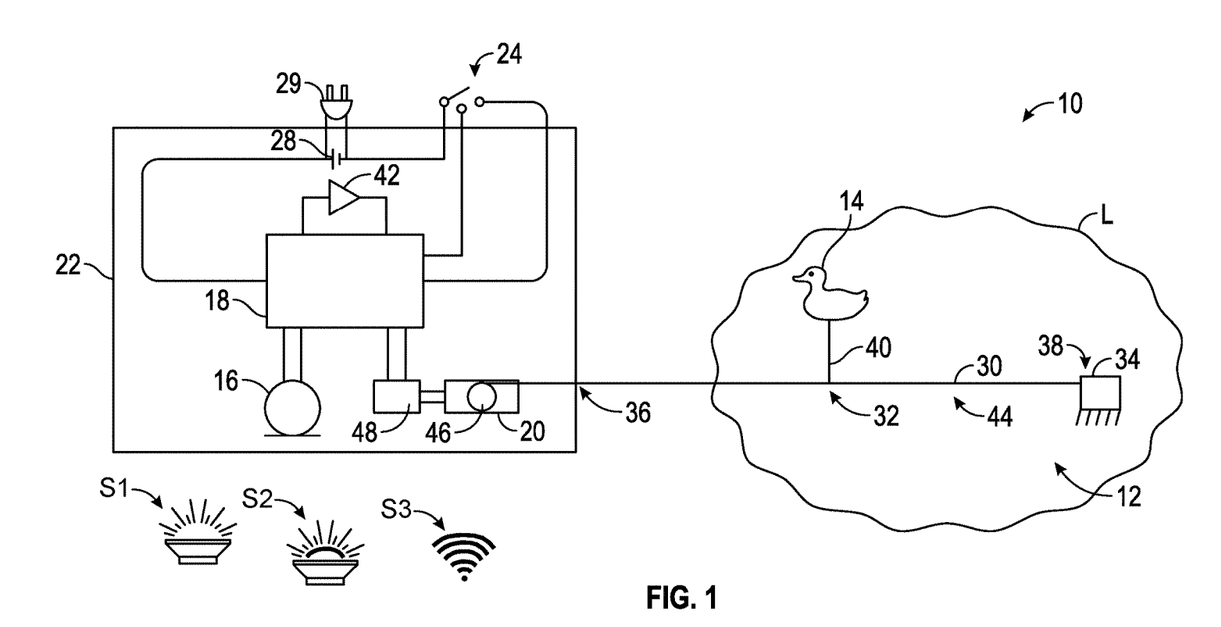
FIG. 1 is a schematic diagram of an intelligent jerk rig control device in accordance with the present invention, shown in an exemplary outdoor environment with a jerk rig and decoy.
Figure 2:
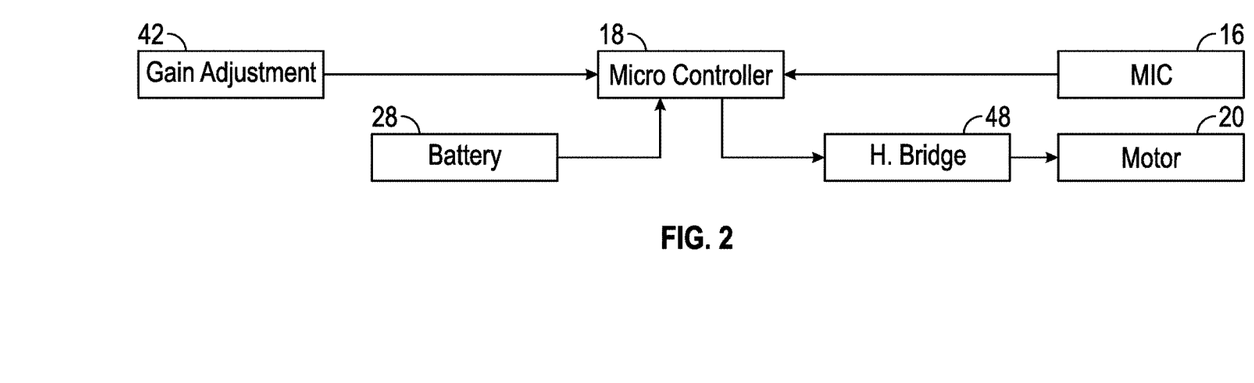
FIG. 2 is a block diagram of the intelligent jerk rig control device of FIG. 1.
Figure 3:
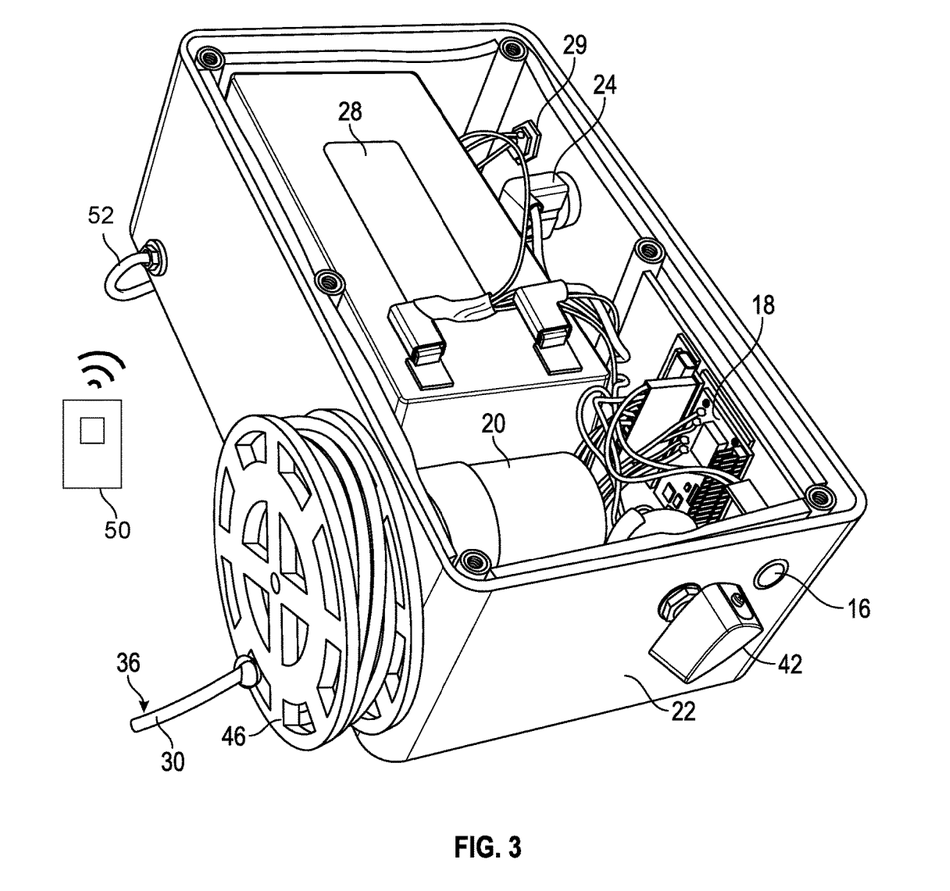
FIGS. 3-5 are top perspective views of the intelligent jerk rig control device with its cover removed to show internal components.
Figure 4:
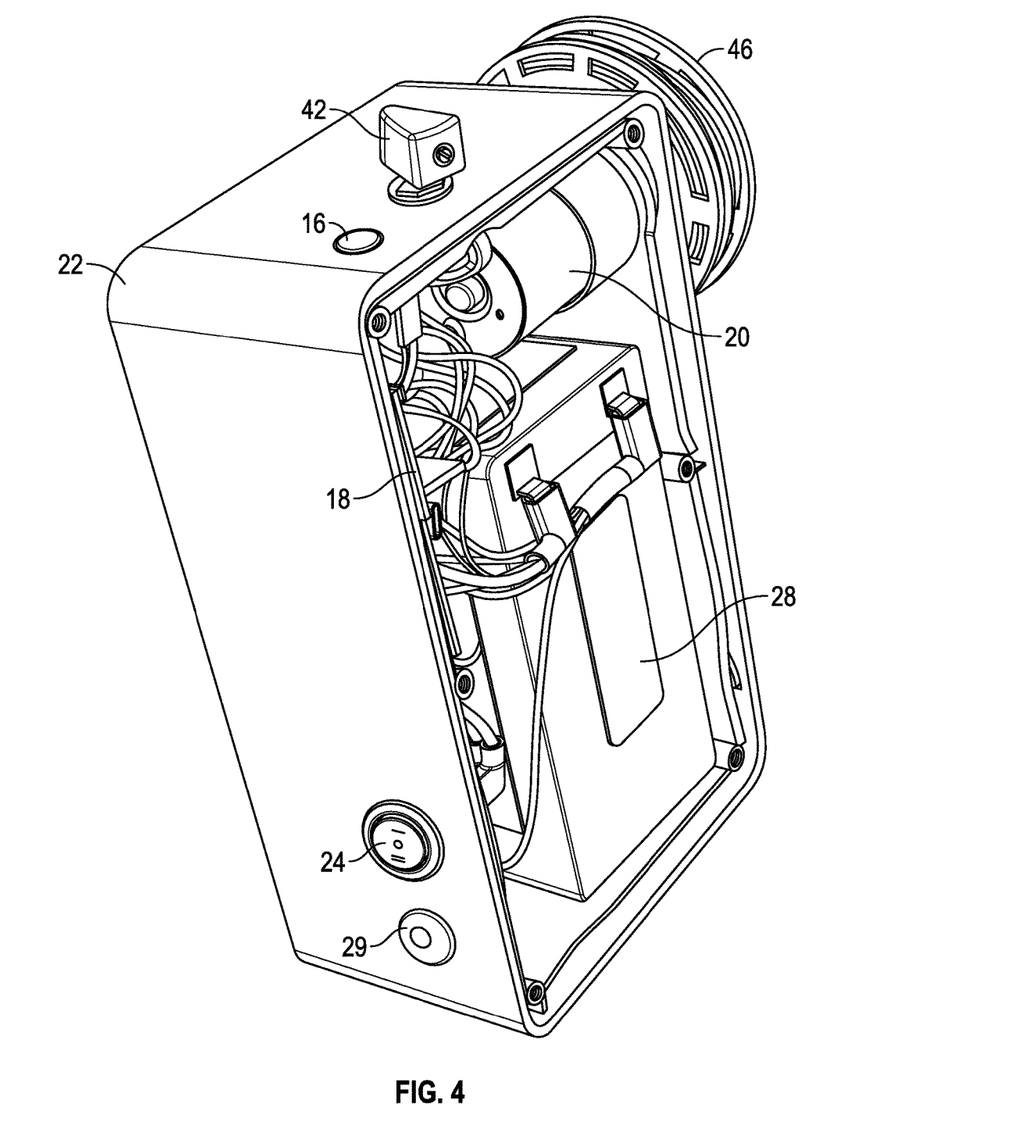
Figure 5:
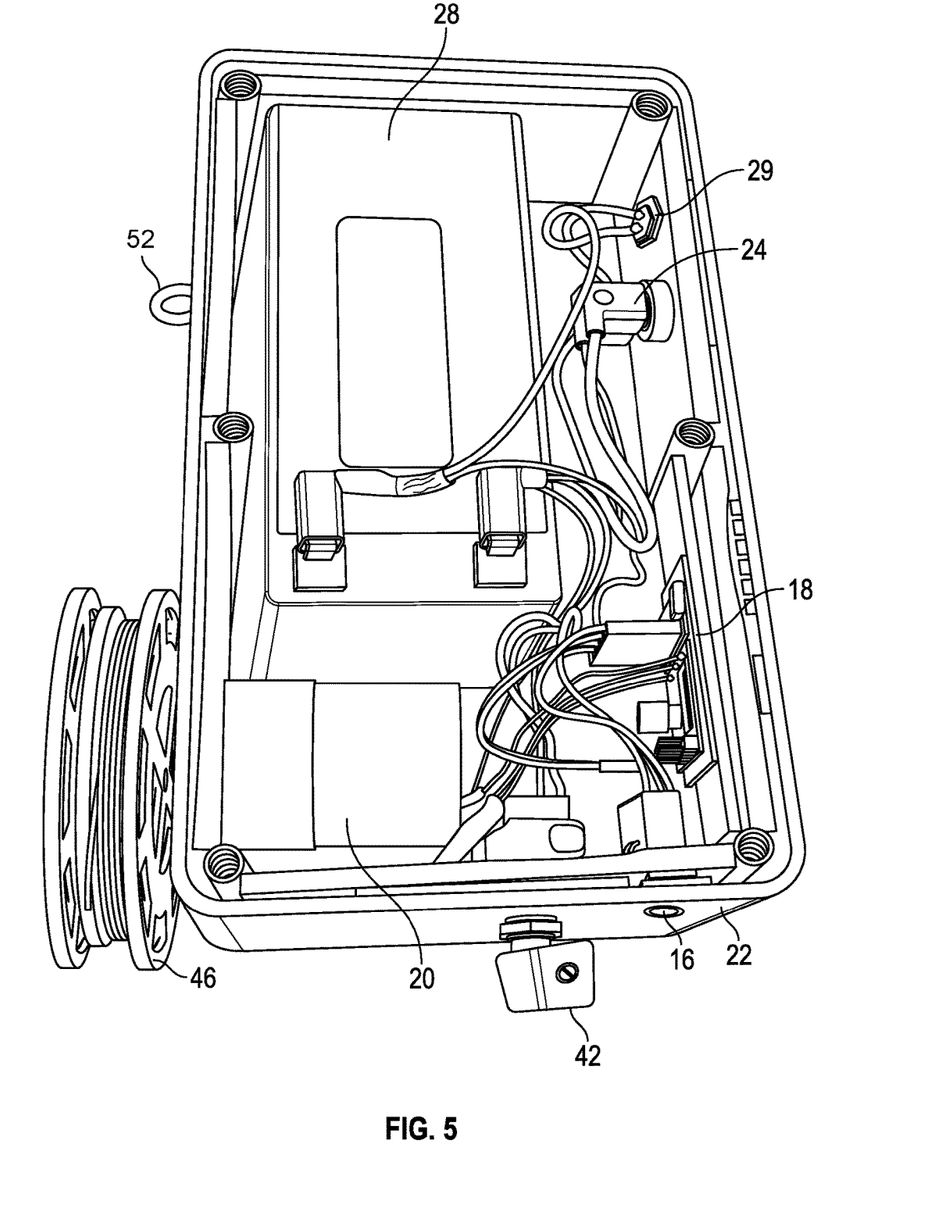

Referring now to the drawings and illustrative embodiments depicted therein, an intelligent jerk rig control apparatus or device 10 is provided for automatically operating a jerk rig 12 that moves hunting decoys, such as decoy 14 shown in FIG. 1. The control device 10 controls the jerk rig 12 by distinguishing sounds that are target animal calls S1, S2, such as duck calls made by a hunter when duck hunting, from ambient or other sounds. The control device 10 is operable to move the jerk rig 12 to move decoy 14 in a desired manner that corresponds to the target animal calls S1, S2. Control device 10 includes a microphone 16 (FIGS. 1-5) that generates a first sound signal in response to a first target animal call S1, and generates a second sound signal in response to a second target animal call S2 that is different from the first target animal call S1. A controller 18 is in communication with the microphone 16, and is configured to distinguish the different sound signals received from the microphone 16. Controller 18 then sends an actuation signal, when appropriate, that corresponds to the received sound signal to an actuator 20, such as an electric motor, to move decoys 14 with jerk rig 12.

Controller 18 generates an actuation signal in response to one of the sound signals from the microphone 16. For example, the controller 18 generates a first actuation signal in response to a first sound S1 and corresponding first sound signal received from the microphone 16. The controller 18 may generate either no actuation signal or a second actuation signal that is different from the first actuation signal in response to the second sound S2. Actuator 20 then moves decoy 14 in a first movement or a second movement in response to the first actuation signal or the second actuation signal, respectively. The controller 18 is configured to not generate any actuation signal in response to a third sound signal generated by the microphone 16 in response to a third sound S3, such as human voices, an overflying aircraft, or rustling leaves.

Target animal calls S1, S2 are generated by the hunter to mimic a call of an animal that the hunter is hunting. For example, if the hunter's target animal is a duck, the hunter will mimic duck calls such as basic quacks, greeting calls, feed calls, hail calls, comeback calls, lonesome calls, pleading calls, and whistles. If the hunter is hunting coyotes, the hunter will mimic coyote calls such as whines, yelps, yips, and howls. If the hunter is hunting turkeys, the hunter will mimic turkey calls such as gobbles, clucks, putts, purrs, yelps, cuts, cackles, and kee-kees. It will be appreciated that the hunter may mimic other calls for other animals.

The control device 10 is configurable to distinguish between different types of target animal calls generated by a hunter or other user, and is further configurable to distinguish between target animal calls and ambient sounds. As a result, the target animal calls detected by the control device 10 result in actuation of the jerk rig 14, whereas ambient sounds, such as human voices, do not result in actuation of the jerk rig. As will be described below in more detail, the hunter may generate target animal calls S1, S2 of a desired species to operate control device 10, which is actuated according to certain characteristics of the call that may not be species-specific. This allows the control device 10 to be operated using calls or other sounds that do not necessarily correspond to a particular species that is being hunted.

Figure 7:
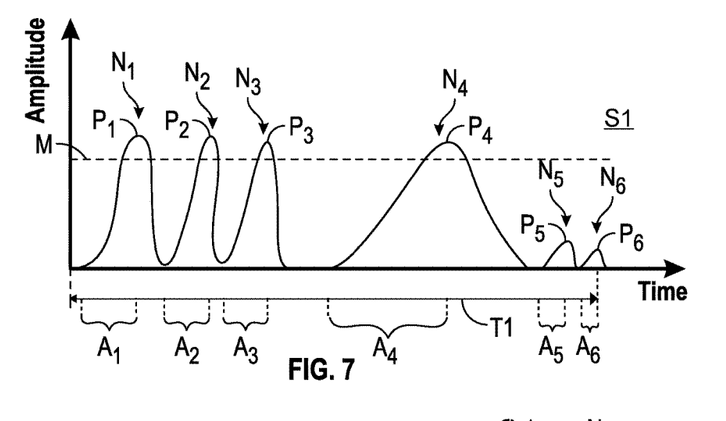
FIG. 7 is a graph depicting amplitude-over-time for sample tones, including a first sound detected by a microphone of the device.

In the illustrated embodiment, the controller 18 distinguishes between the first sound signal (FIG. 7), second sound signal (FIG. 8), and third sound signal (FIG. 9) according to a number of separate tones and/or the sharpness of attack of each tone in the sound signals. For example, the microphone 16 detects a number of separate tones $N_1$-$N_6$ during a first predetermined timeframe T1 (FIG. 7). It should be understood that the predetermined timeframes are rolling time periods, such that a given predetermined timeframe ends at the present time and begins at a predetermined length of time that preceded the present time. Optionally, a predetermined timeframe may begin at the first detection of a first tone (e.g., $N_1$, $N_7$, or $N_9$) that exceeds a set threshold volume amplitude M, and end after a predetermined amount of time has elapsed following the first tone.

Figure 8:
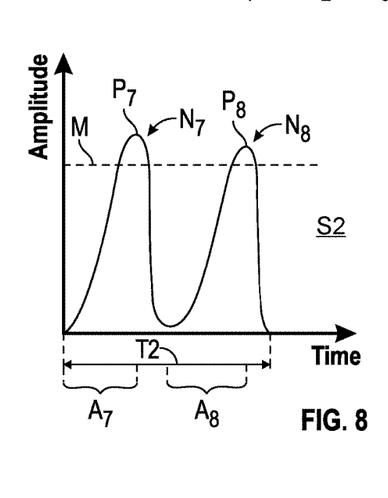
FIG. 8 is another graph depicting amplitude-over-time for sample tones, including a second sound detected by the microphone of the device.
Figure 9:
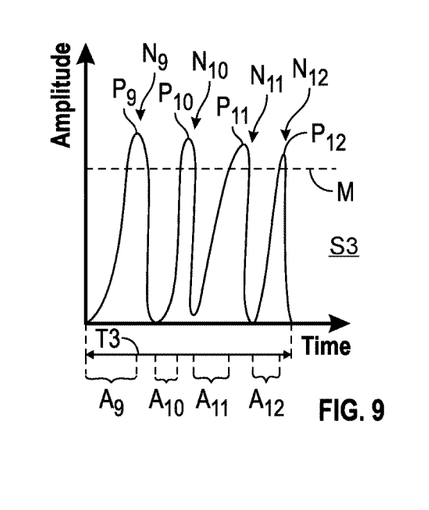
FIG. 9 is another graph depicting amplitude-over-time for sample tones, including a third sound detected by the microphone of the device.

The controller 18 distinguishes between the first sound signal, the second sound signal, and the third sound signal according to the respective attacks $A_1$-$A_6$, $A_7$-$A_8$, $A_9$-$A_{12}$ and the respective peak amplitudes $P_1$-$P_6$, $P_7$-$P_8$, $P_9$-$P_{12}$ of separate tones $N_1$-$N_6$, $N_7$-$N_8$, $N_9$-$N_{12}$ in respective ones of the first target animal call S1, the second target animal call S2, and the third sound S3, the corresponding signals of which are depicted graphically in FIGS. 7-9, respectively. Each tone $N_1$-$N_{12}$ has an attack with a rise in amplitude (volume) that may be sharp (fast) or soft (slow), and a peak amplitude that is higher or lower than a threshold amplitude M. The attack of the tone is an initial sharpness of the tone, or the rate at which the tone reaches its peak amplitude or volume. For example, tones with a sharp attack rapidly increase to a peak volume and tones with a slow attack will slowly or gradually increase to the peak volume.

FIG. 7 depicts a first signal generated in response to the first target animal call S1, in which the first three tones $N_1$-$N_3$ have relatively sharp attacks $A_1$-$A_3$ followed by a fourth tone $N_4$ that has a slow attack $A_4$, and fifth and sixth tones $N_5$, $N_6$ that have slow attacks $A_5$, $A_6$, all occurring during the first predetermined timeframe T1. Tones $N_1$-$N_4$ have respective peak amplitudes $P_1$-$P_4$ that are greater than the threshold amplitude M, while tones $N_5$, $N_6$ have peak amplitudes $P_5$, $P_6$ that are well below the threshold amplitude M. Controller 18 will determine the number of tones that have a sharp attack within the first predetermined timeframe T1, and uses this information to distinguish the first sound signal (FIG. 7), which has a finite number of sharp attack tones $N_1$-$N_3$ in the predetermined timeframe T, from the second sound signal (FIG. 8) that has a second finite number of sharp attack tones $N_7$-$N_8$ in the second predetermined timeframe T2, which is different than the number of sharp attack tones in the first sound signal. Controller 18 will also distinguish a third sound signal (FIG. 9) that has a third finite number of sharp attack tones $N_9$-$N_{12}$ in the third predetermined timeframe T3 that is different than both of the first and second sound signals. For example, the third finite number may be a range of finite numbers or zero. For purposes of this example, it will be appreciated that the first, second, and third predetermined timeframes T1-T3 may be identical predetermined lengths of time or timeframes T.

The controller 18 can also generate the first actuation signal or second actuation signal in response to a silent period. The silent period is a predetermined amount of time that has elapsed since the controller 18 last energized actuator 20 to actuate the jerk rig 12. For example, the silent period may be fifteen seconds without the microphone 16 generating the first sound signal or the second sound signal. The hunter or other user may set the controller 18 to generate one of the first actuation signal or second actuation signal, as a default, after the predetermined silent period. Therefore, the controller 18 may still generate the first actuation signal or second actuation signal to move the decoys 14 when the hunter is preoccupied with other tasks.

The actuator 20 is in communication with an H-bridge circuit 48 and the controller 18 (FIG. 2) to move the jerk rig 12 in response to the actuation signals. The actuator 20 is operable to move the hunting decoy 14 in the first movement in response to the first actuation signal, and to move the hunting decoy 14 in the second movement in response to the second actuation signal, which is different than the first movement. Therefore, the number of separate tones during the predetermined timeframe T, and the separate tones' individual characteristics, corresponds to either the first movement, the second movement, or no movement at all.

In the illustrated embodiment shown in FIGS. 1 and 3-5, the actuator 20 includes a spool 46. The spool 46 rotates in a first direction to retract a line 30, and rotates in a second direction to release line 30. The spool 46 is rotatable in the first direction or the second direction based on the setting of the H-bridge 48, which permits the actuator 20 (e.g., an electric motor) to be driven in opposite directions, as determined by the actuation signal sent from the controller 18. Spool 46 may retract and release at constant rates or at variable rates to move the decoy 14 in different movements in response to the sound signals. In an alternative embodiment, the actuator is a linear actuator or oscillator, such as a ball screw or solenoid or servo-actuated pivot arm, which oscillates to retract and release the line 30 of the jerk rig 12, similar to the motion provided by the spool 46.

Again referring to FIG. 1, jerk rig 12 connects the decoy 14 to the actuator 20, which is operable to move the decoy 14 in response to the actuation signals. The jerk rig 12 includes line 30 having a plurality of connection points 32, and an anchor 34. The connection points 32 are between a first end 36 and a second end 38 of the line 30. Each connection point 32 is further coupled to one or more decoys 14 by a decoy line 40. The first end 36 of the line 30 is coupled to the spool 46 of actuator 20, and the second end 38 of the line 30 is coupled to the anchor 34. The anchor 34 may be a heavy and/or securable object spaced some distance from the actuator 20, and is immobile or otherwise substantially fixed in place during use. Anchor 34 may lay atop the ground or at the bed or bottom of a body of water L, or may be secured or fastened to a fixed object or surface, or otherwise fixed in place.

The line 30 may be partially elastic, such as in a distal region 44 between decoys 14 and second end 38, so that the line 30 is normally biased toward the anchor 34 when actuator 20 is not activated. When the actuator 20 selectively retracts the line 30, the distal region 44 of the line 30 is elongated, which causes line 30 to move the hunting decoys 14. Furthermore, the actuator 20 may return to its starting position at a constant rate or at variable rates to move the hunting decoys 14 in different movements in response to the sound signals. Therefore, the actuator 20 moves the jerk rig 12 and hunting decoys 14 from an initial position to a final position, and allows the jerk rig 12 and hunting decoys 14 to return to the initial position due to the biasing force of the elastic distal region 44 of the line 30. Optionally, the anchor may include a secondary actuator that works in a coordinated manner with the actuator 20, or may use a spring-biased retractor, or another control device 10, or the like.

Figure 6:
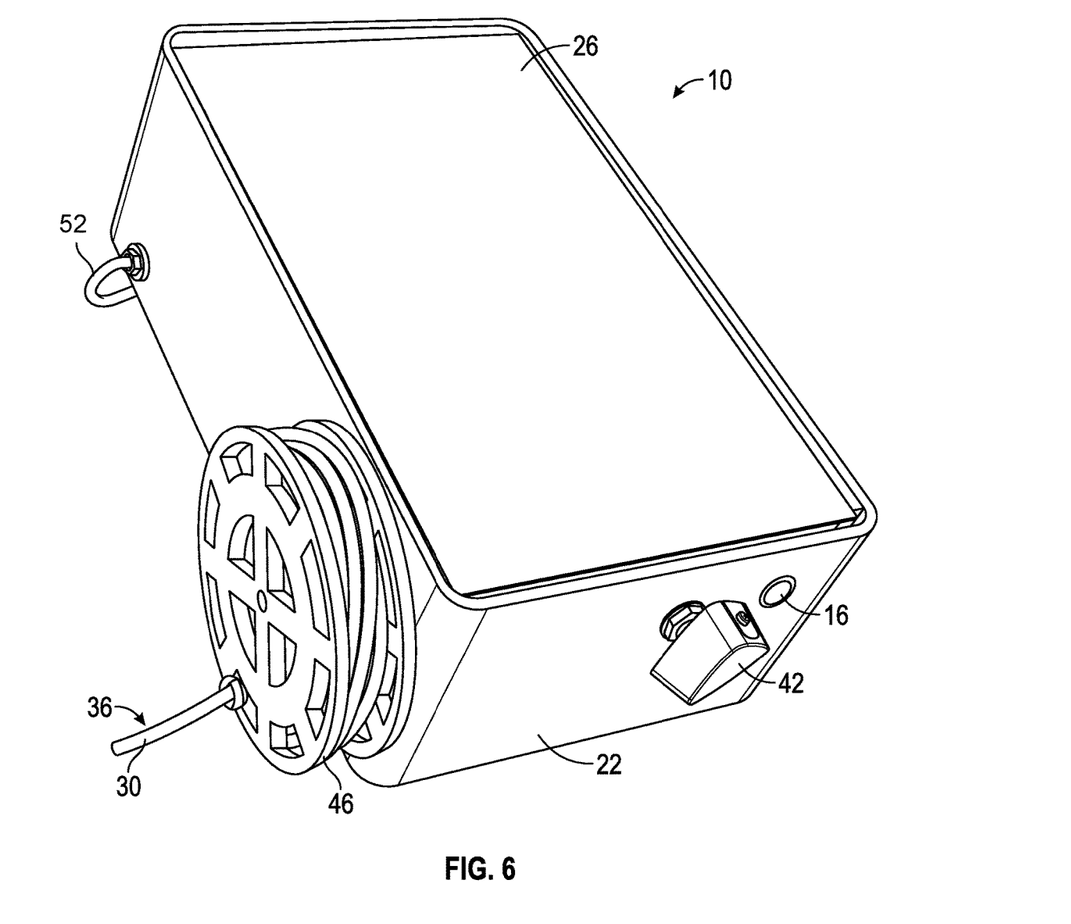
FIG. 6 is a top perspective view of the device of FIGS. 3-5 with its cover in place.

The control device 10 is powered by an electric power source and is further controlled by a power switch 24, such as shown in FIGS. 1 and 3-5. In the illustrated embodiment, the power source is a rechargeable battery 28 contained in a housing 22, which is normally closed by a removable cover 26 (FIG. 6). The battery 28 is in communication with a charging port 29 that is mounted to the housing 22 to recharge the battery 28 after operation. Battery 28 allows the control device 10 to be operable far from a household circuit outlet and without an external electrical cord. Optionally, the power source may be a capacitor, solar cell, or an electrical circuit associated with another power source such as a household circuit or a separate battery power source, such as on a vehicle.

In the illustrated embodiment, the switch 24 in the illustrated embodiment (FIGS. 1 and 3-5) is a three-way rocker switch that is operable for the hunter to select multiple modes of operation. The hunter can choose between a first mode and a second mode, and can turn the control device 10 off by operating switch 24. The first mode is operable to operate the control device 10 in response to a target animal call S1, S2 or a silent period, as described above. The second mode is operable to operate the control device 10 at predetermined periodic time intervals, not in response to a target animal call S1, S2 or a silent period. Thus, the second mode does not permit the controller 18 to send actuation signals in response to sounds detected by the microphone 16, and may de-activate the microphone. Instead, in the second mode the controller 18 automatically generates actuation signals, such as the first actuation signal or the second actuation signal, at predetermined periodic time intervals after a predetermined amount of time that has elapsed since a previous actuation of the control device 10. Placing the control device 10 in the off mode disables the control device 10 from operating to save electrical energy stored in the battery 28 and prevent undesired operation of the control device 10, for example, while traveling or when in storage.

As shown in FIGS. 1 and 3-5, the various components of the control device 10 are contained in the housing 22, which may be a sealed waterproof housing, and which is enclosed by the cover 26. The microphone 16, charging port 29, switch 24, and an adjustable amplifier control 42 are mounted and sealed to the housing 22. The housing 22 is generally waterproof, such that it is sealed from moisture and weather to be operable in outdoor environments, particularly wetlands or bodies of water, such as a pond or lake L (shown diagrammatically in FIG. 1). Furthermore, the components in the housing 22 are mounted to be durable, and padding material may be inserted into the housing cavity, so that the control device 10 will remain operable even if, for example, the control device 10 is dropped on the ground or struck with a rock. The top or cover 26 (FIG. 6) of the control device 10 is removable to facilitate repair or maintenance, while still allowing the control device 10 to be waterproof. For example, the hunter may have to remove the cover 26 to replace the battery 28.

The microphone 16 is generally positioned to enable it to readily detect the target animal calls S1, S2 from the hunter. For example, the microphone 16 is mounted to the outside of the housing 22 so the microphone 16 can detect the hunter's target animal calls S1, S2. In the illustrated embodiment, the microphone 16 is mounted to the housing 22 at an opening formed in a housing wall. The microphone 16 is preferably durable and protected such that it can operate in moisture and harsh weather conditions, such as in outdoor environments, particularly wetlands or bodies of water, such as a pond or lake L.

In the illustrated embodiment, the control device 10 includes an amplifier associated with the adjustable amplifier control 42 to adjust a threshold amplitude M that is related to a gain or sensitivity of the microphone 16. For example, the hunter may use the amplifier control 42 to adjust the amplifier so that the microphone 16 generates signals to the controller 18 for sounds or tones that have lower volumes or amplitudes (see FIGS. 7-9). Detecting lower volume sounds may be beneficial to the hunter when the hunter is far from the control device 10 in a quiet area. Similarly, the hunter can adjust the amplifier control 42 to adjust the threshold amplitude M higher so that the microphone 16 generates sound signals to the controller 18, to reduce the likelihood that ambient sounds such as wind, rain, rustling reeds or leaves, overflying aircraft, and the like, will have peak amplitudes that exceed the selected threshold amplitude M.

Optionally, a wireless remote control 50 (FIG. 3) may be provided, which is in wireless communication with the controller 18, via an antenna 52 associated with a receiver that is associated or in communication with the controller 18. The remote control 50 is configured to generate the same or substantially the same first actuation signal or second actuation signal as described above, but without the microphone 16 detecting sound signals. Thus, the hunter with the remote control may wirelessly control the actuator 20 by sending the first or second actuation signal to controller 18 when the hunter is away from the actuator 20, and without need for making any animal calls. Furthermore, the remote control 50 may permit the hunter to wirelessly adjust the sensitivity of the amplifier, the duration of the predetermined timeframe T, or other operating parameters.

Thus, the intelligent jerk rig control device 10 operates by listening for one of the target animal calls S1, S2 during a predetermined timeframe T, determining the type of the target animal call S1, S2 detected during the predetermined timeframe T, and actuating control device 10 to move decoys 14 in the first movement in response to the first type of target animal call S1 or in the second movement in response to the second type of target animal call S2. Determining the type of target animal call S1, S2 includes setting the controller 18 to identify the number of tones N exceeding the threshold amplitude M during the predetermined timeframe T, wherein the number of tones is within a tone number range, and the controller 18 may also distinguish between sharp and soft tone attacks as well. The hunter sets the tone number range, which is generally specific to the target animal. For example, if the hunter is hunting ducks, the hunter would generally set the tone number range that corresponds to a duck call. The control device 10 mimics the movement of live animals in response to the target animal call S1, S2 by moving the decoys 14 from an initial position to a final position and returning the decoys 14 to the initial position, for example, in the first movement or the second movement. The control device 10 may also be programmed to move the decoys 14 after a predetermined silent period, which is a time period without actuating the actuator 20, has elapsed.

Therefore, the jerk rig control device assists hunters by providing a hands-free device for automatically controlling the jerk rig to move decoys, in response to target animal calls S1, S2 made by the hunter, or automatically in predetermined periods of time. The control device determines the type of target animal call S1, S2 based on the attack and amplitude of the call, and accordingly moves or does not move the decoys. The jerk rig control device allows the hunter to reduce the workload involved with controlling the decoy while operating a call and holding a firearm. Thus, the control device and method improves the safety and effectiveness of the hunter or other user of the device.

Changes and modifications in the specifically described embodiments can be carried out without departing from the principles of the present invention which is intended to be limited only by the scope of the appended claims, as interpreted according to the principles of patent law including the doctrine of equivalents.

The invention claimed is:

1. A device for automatically operating a jerk rig for moving hunting decoys, said device comprising:
   a microphone configured to generate a first sound signal in response to a first sound and a second sound signal in response to a second sound that is different from the first sound;
   a controller in communication with said microphone, wherein said controller is configured to:
      distinguish between said first sound signal and said second sound signal and to generate a first actuation signal in response to said first sound signal;
      generate a second actuation signal that is different from said first actuation signal in response to said second sound signal;
      not generate any actuation signal in response to a third sound signal generated by said microphone in response to a third sound that is different from said first sound and said second sound;
      distinguish between said first sound signal and said second sound signal according to a number of separate tones in said first sound signal and second sound signal and detected by said microphone during a predetermined timeframe; and
      distinguish between said third sound signal and either of said first sound signal and said second sound signal according to a sharpness of an attack of one or more separate tones in the first sound, the second sound, and the third sound; and
   an actuator in communication with said controller and operable to move a hunting decoy coupled to the jerk rig in response to said first actuation signal.

2. The device of claim 1, wherein said controller is configured to either (i) not generate any actuation signal, or (ii) generate a second actuation signal that is different from said first actuation signal, in response to said second sound signal.

3. The device of claim 1, wherein said actuator is operable to move the hunting decoy in a second movement that is different from a first movement in response to said second sound signal.

4. The device of claim 1, wherein said controller is operable to activate said actuator to thereby generate a first movement of the hunting decoy in response to said first sound signal and to generate a second movement of the hunting decoy that is different from the first movement in response to said second sound signal.

5. The device of claim 1, further comprising a rechargeable electrical power supply in electrical communication with said controller and said actuator.

6. The device of claim 1, further comprising a remote control configured to generate a wireless control signal, wherein said controller is operable to receive said wireless control signal and to generate said first actuation signal or a second actuation signal in response to said wireless control signal.

7. The device of claim 1, wherein said controller is operable to periodically generate said first actuation signal or a second actuation signal after a predetermined amount of time elapses following a previous actuation signal.

8. The device of claim 1, further comprising:
   a weather resistant housing, wherein said microphone, said controller, and said actuator are mounted in said housing;
   a rechargeable battery mounted in said housing and in electrical communication with at least said controller;
   a spool mounted external to said housing and rotatably drivable by said actuator, wherein said spool is configured to selectively wind and unwind a line associated with the jerk rig in response to said actuator and said controller.

9. A device for operating a jerk rig, said device comprising:
   a sensor configured to detect a plurality of target animal calls and at least one other sound that is different from the plurality of target animal calls, to distinguish between the plurality of target animal calls and the at least one other sound, and to generate two three or more different sound signals in response to detecting at least two different ones of the plurality of target animal calls and the at least one other sound;

wherein said sensor is configured to distinguish between the target animal calls according to a number of separate tones in a first of the target animal calls and a second of the target animal calls during a predetermined timeframe, and said sensor is configured to distinguish between the at least one other sound and the target animal calls according to a sharpness of attack of one or more separate tones in the first and second target animal calls and in the at least one other sound;

an actuator in communication with the sensor to receive said sound signals, and said actuator configured to be coupled to the jerk rig, wherein said actuator is operable in response to at least two of said different sound signals corresponding to the first and second target animal calls from said sensor to selectively actuate the jerk rig in two or more different motion patterns;

wherein said actuator does not actuate the jerk rig in response to said sound signal corresponding to the at least one other sound; and wherein a first of said two or more different motion patterns corresponds to a first of said three or more different sound signals, and a second of said two or more different motion patterns corresponds to a second of said three or more different sound signals.

10. The device of claim 9, wherein said sensor is operable to distinguish between the plurality of target animal calls according to the number of tones reaching at least a threshold volume amplitude during the predetermined timeframe.

11. The device of claim 10, wherein said actuator is operable to move a decoy coupled to the jerk rig in the first of said motion patterns corresponding to a first number of tones in the first of the target animal calls, and said actuator is operable to move the decoy coupled to the jerk rig in the second of said different motion patterns corresponding to a second number of tones in the second of the target animal calls, wherein the second number is different from the first number.

12. The device of claim 9, wherein said actuator is operable to move the jerk rig in at least one of said two or more different motion patterns in response to said sensor sensing a silent period having a predetermined length of time.

13. A method of operating a jerk rig, said method comprising:

listening for a first target animal call, a second target animal call, and at least one other sound with a microphone of a control device during a predetermined timeframe, wherein the first and second target animal calls are different from one another and from the other sound;

distinguishing a target animal call as either the first target animal call or the second target animal call with a controller that is in communication with the microphone according to a number of separate tones in the first and second sound signals detected by the microphone during a predetermined timeframe;

generating a first actuation signal with the controller in response to distinguishing the target animal call as the first target animal call;

energizing an actuator in response to the first actuation signal to move a decoy that is coupled to the actuator in a first motion pattern;

generating a second actuation signal with the controller in response to distinguishing the target animal call as the second target animal call;

energizing the actuator in response to the second actuation signal to move the decoy in a second motion pattern that is different from the first motion pattern;

distinguishing the other sound from the first or second target animal call according to a sharpness of an attack of one or more separate tones in the first and second target animal calls and in the other sound; and not generating any actuation signal with the controller in response to distinguishing the other sound.

14. The method of claim 13, wherein said distinguishing the target animal call further comprises identifying, in the target animal call and during the predetermined timeframe, a number of tones having a threshold sharpness of an attack and a threshold volume amplitude.

15. The method of claim 13, further comprising energizing the actuator to move the decoys after a predetermined silent period during which the actuator has not been energized.

16. The method of claim 13, wherein said energizing the actuator causes the decoy to return from a final position to an initial position.

* * * * *

UNITED STATES PATENT AND TRADEMARK OFFICE
CERTIFICATE OF CORRECTION

PATENT NO. : 10,194,652 B1
APPLICATION NO. : 14/996603
DATED : February 5, 2019
INVENTOR(S) : Bloomquist et al.

Page 1 of 1

It is certified that error appears in the above-identified patent and that said Letters Patent is hereby corrected as shown below:

In the Claims

Column 8
Line 64, Claim 9, delete "two".

Signed and Sealed this
Twenty-fifth Day of June, 2019

Andrei Iancu
*Director of the United States Patent and Trademark Office*